(12) United States Patent
Wu et al.

(10) Patent No.: US 7,794,326 B2
(45) Date of Patent: Sep. 14, 2010

(54) GAME CONTROLLER

(75) Inventors: Chun-An Wu, Taipei Hsien (TW); Chih-Rong Yang, Taipei Hsien (TW)

(73) Assignee: Giga-Byte Technology Co., Ltd., Taipei County (TW)

( * ) Notice: Subject to any disclaimer, the term of this patent is extended or adjusted under 35 U.S.C. 154(b) by 1199 days.

(21) Appl. No.: 11/204,028

(22) Filed: Aug. 16, 2005

(65) Prior Publication Data

US 2007/0060393 A1 Mar. 15, 2007

(51) Int. Cl.
*A63F 13/06* (2006.01)

(52) U.S. Cl. ............................ 463/37; 463/38; 345/156; 345/161

(58) Field of Classification Search ................... 463/37, 463/36, 38, 47; 345/156, 157, 160, 161, 345/163–169; 341/22; 273/148 B
See application file for complete search history.

(56) References Cited

U.S. PATENT DOCUMENTS

| | | | |
|---|---|---|---|
| 6,288,709 B1 * | 9/2001 | Willner et al. ............... | 345/169 |
| 6,743,100 B1 * | 6/2004 | Neiser .......................... | 463/37 |
| 2002/0097229 A1 * | 7/2002 | Rose et al. ................... | 345/173 |
| 2003/0054883 A1 * | 3/2003 | Sakiyama et al. ............. | 463/36 |
| 2004/0046732 A1 * | 3/2004 | Chesters ...................... | 345/156 |
| 2004/0259638 A1 * | 12/2004 | Kramer et al. ................ | 463/36 |
| 2006/0111180 A1 * | 5/2006 | Cheng .......................... | 463/36 |

FOREIGN PATENT DOCUMENTS

| JP | 06054962 A * | 3/1994 |
|---|---|---|
| WO | WO-02/09283 A1 * | 1/2002 |

* cited by examiner

*Primary Examiner*—James S McClellan
*Assistant Examiner*—Lawrence Galka
(74) *Attorney, Agent, or Firm*—Rosenberg, Klein & Lee

(57) ABSTRACT

This invention relates to a game controller. The game controller particularly has two movable handles. The two movable handles can be rotated to any angle for users' holding customs and can be received for saving space. Moreover, the game controller is further integrated with functions of game control and home-use remote control, corresponding to a plurality of game control buttons and home-use remote control buttons. Thus, the game controller at least has advantages of providing two control functions.

10 Claims, 4 Drawing Sheets

GAME CONTROLLER

TECHNICAL FIELD

This invention generally relates to a game controller and a home-use remote control, and particularly to integrations of both the game controller and the home-use remote control functions thereof or further functions thereof.

BACKGROUND OF THE INVENTION

Conventional game controllers with handles are designed as having fixed handles. That is, the handles are fixed at particular angle. In such manner, even though a user finds that it is difficult hold the game controller, the user has to get used to it.

In addition to a game controller, most users have one or more home-use remote control for controlling corresponding household appliances, e.g. a TV and an air conditioner. Conventional game controller and home-use remote controls are usually scattered on a desk, making a room messy and space taking.

Besides, a conventional game controller has single function of controlling game progress while a conventional home-use remote control has single function of controlling a household appliance. Both the game controller and the home-use remote control need to be enhanced and improved.

SUMMARY OF INVENTION

The present invention describes a new game controller which is equipped with movable handles to be rotated to any angle so that users can hold the game controller according to their customs. Further, the movable handles can be received and save space.

More specifically, the game controller has a housing and an input unit exposed from the housing. The housing includes a base and two movable handles. Each movable handle is pivotally connected to the base and each movable handle protrudes from the base with a distance when the movable handle is rotated to a using position, and overlaps the base when the movable handle is rotated to a receiving position.

Besides, in a preferred embodiment, the game controller is integrated with functions of game control and home-use remote control, and the input unit has game control buttons and home-use remote control buttons corresponding to the game control and home-use remote control functions.

Thus, the game controller apparently has advantages of providing two or more control functions. In addition, its movable handles can be rotated to any angle so that users can hold the game controller easily. Further, the movable handles can be received and save space.

BRIEF DESCRIPTION OF DRAWINGS

The invention will be more clearly understood after referring to the following detailed description read in conjunction with the drawings wherein.

DETAILED DESCRIPTION OF PREFERRED EMBODIMENTS

Figure 1:
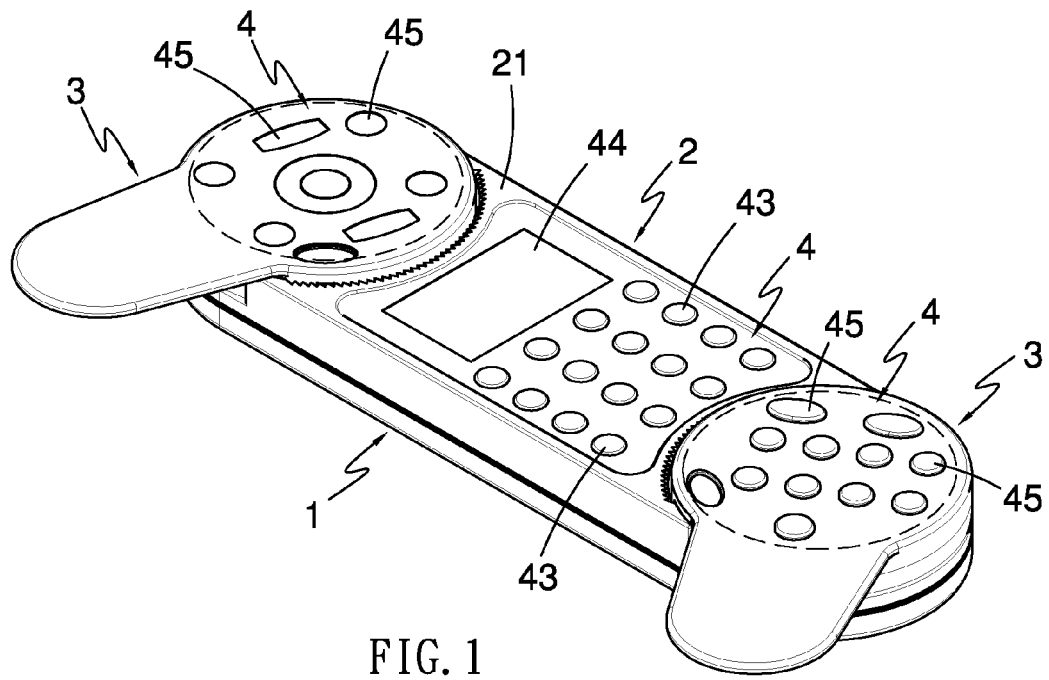
FIG. 1 is a front view illustrating movable handles being rotated to a using position in an embodiment according to the present invention.

Please refer to FIG. 1, which illustrates a preferred embodiment according to the present invention, in which a game controller integrated with a game control function is disclosed. The game controller has a housing 1 and an input unit 4 exposed from the housing. The game controller can be connected to a host via a wire or wireless communication. The host could be a personal computer or a video game set. The housing 1 includes a base 2 and two movable handles 3, and each movable handle 3 is assembled to the base 2 in a rotatable manner.

Figure 2:
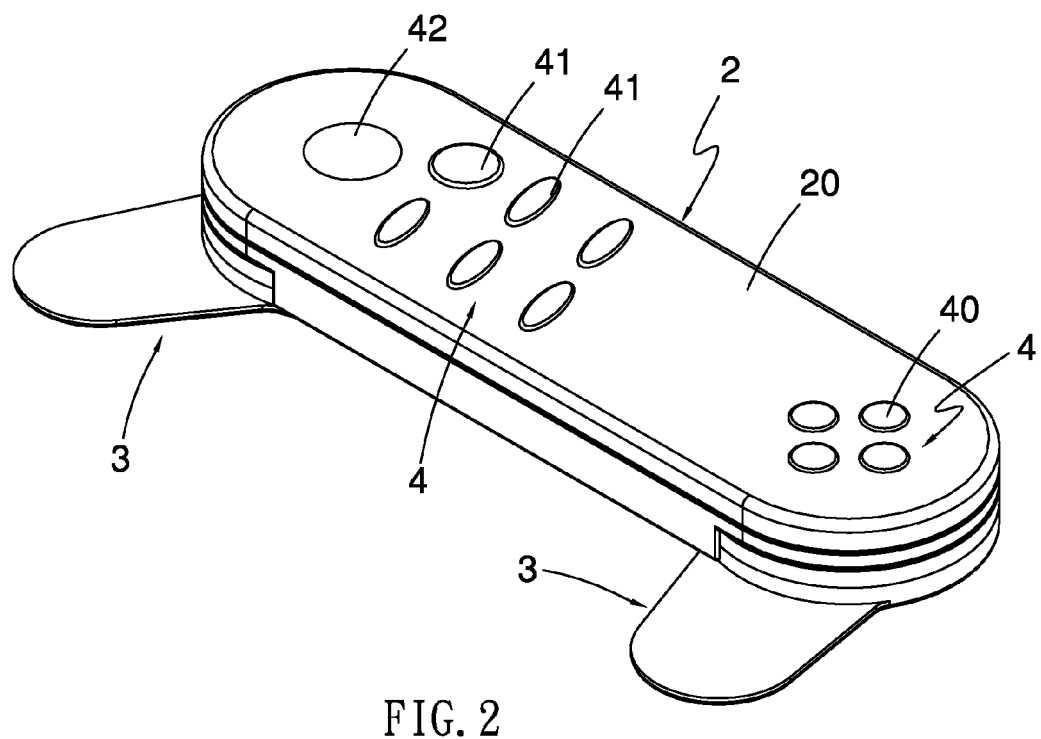
FIG. 2 is a rear view illustrating the movable handles being rotated to a using position in the embodiment according to the present invention.

FIGS. 1 and 2 illustrate that the two movable handles 3 protrudes from the base 2 with a distance when they are rotated to a using position. FIG. 2 further illustrates that the base 2 has a bottom surface 20 and the input unit 4 includes a plurality of game control buttons 40 exposed within a certain region of the bottom surface 20. The certain region is the region tangible by a thumb when the movable handle 3 is rotated to the using position status. In this embodiment, the game controller is further integrated with computer control functions, such as functions of a mouse, a touch pad or a track ball, and the input unit 4 further includes a plurality of computer buttons 41 and a position detection module 42, in which the computer buttons are exposed from the bottom surface 20. The computer buttons can be functioned as an "Enter" button, left and/or right buttons of the mouse, or other buttons. The position detection module 42 can be a rolling ball and/or other accessory elements of the mouse or the track ball, or an optical detection module used in an optical mouse, or a touch sensible circuit used in the touch pad.

In addition, FIG. 1 also illustrates that the base 2 has a top surface 21. In this embodiment, the game controller is further integrated with a home-use remote control function and handwriting input function. The input unit 4 further includes a plurality of first home-use remote control buttons 43 and a handwriting input pad 44 exposed from the top surface 21.

In the status illustrated in FIG. 1, a user can also use the home-use remote control buttons 43 to remote control their corresponding household appliances and can use the handwriting input pad 44 to input characters, or graphs into its corresponding computer. In the status illustrated in FIG. 2, the user can hold the two movable handles 3 and use thumbs to operate the game control buttons 40 to control operation of the host, or, specifically, to control and to play the computer games through the host.

Figure 3:
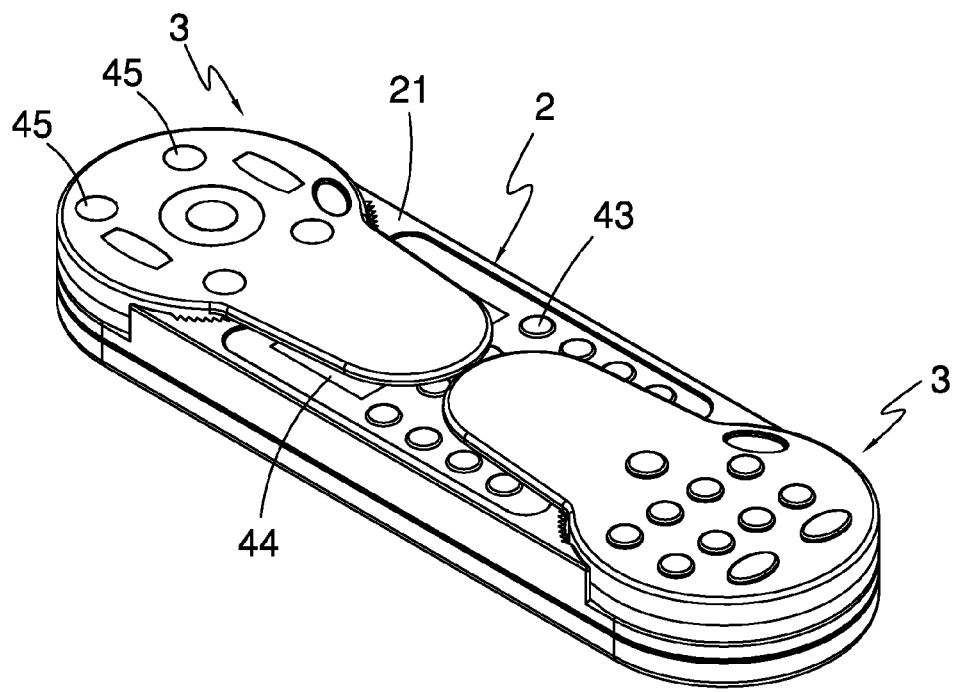
FIG. 3 is a front view illustrating the movable handles being rotated to a receiving position in the embodiment according to the present invention.
Figure 4:
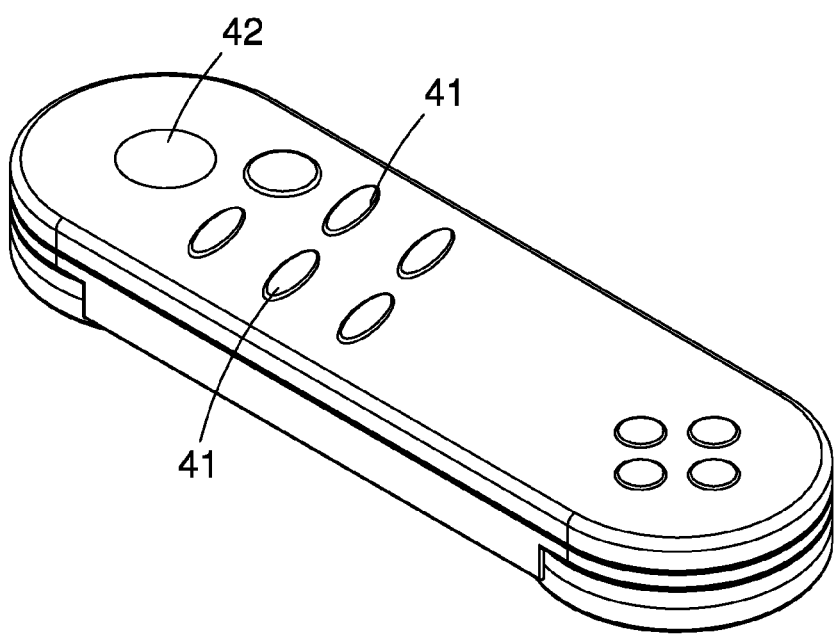
FIG. 4 is a rear view illustrating the movable handles being rotated to a receiving position in the embodiment according to the present invention.

Please refer to FIGS. 3 and 4, which illustrate that the movable handles 3 are rotated to a receiving position and overlaps the top surface 21 of the base 2. In such status, the movable handles 3 do not occupy any space and cover and protect the first home-use remote control buttons 43 and the handwriting input pad 44. In addition, the user can use the computer buttons 41 and the position detection module 42 to operate computer functions and computer cursor position control functions as well.

Figure 6:
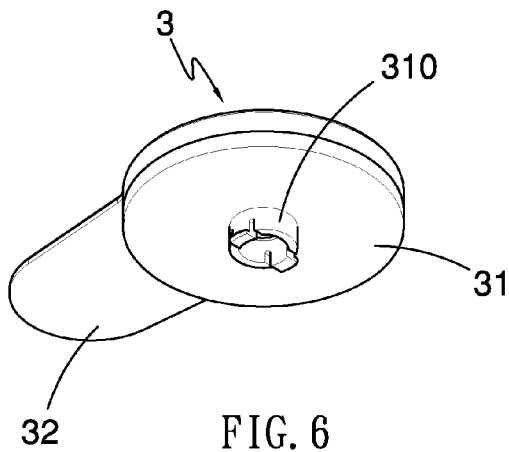
FIG. 6 is a rear view illustrating the movable handles of the embodiment according the present invention.
Figure 5:
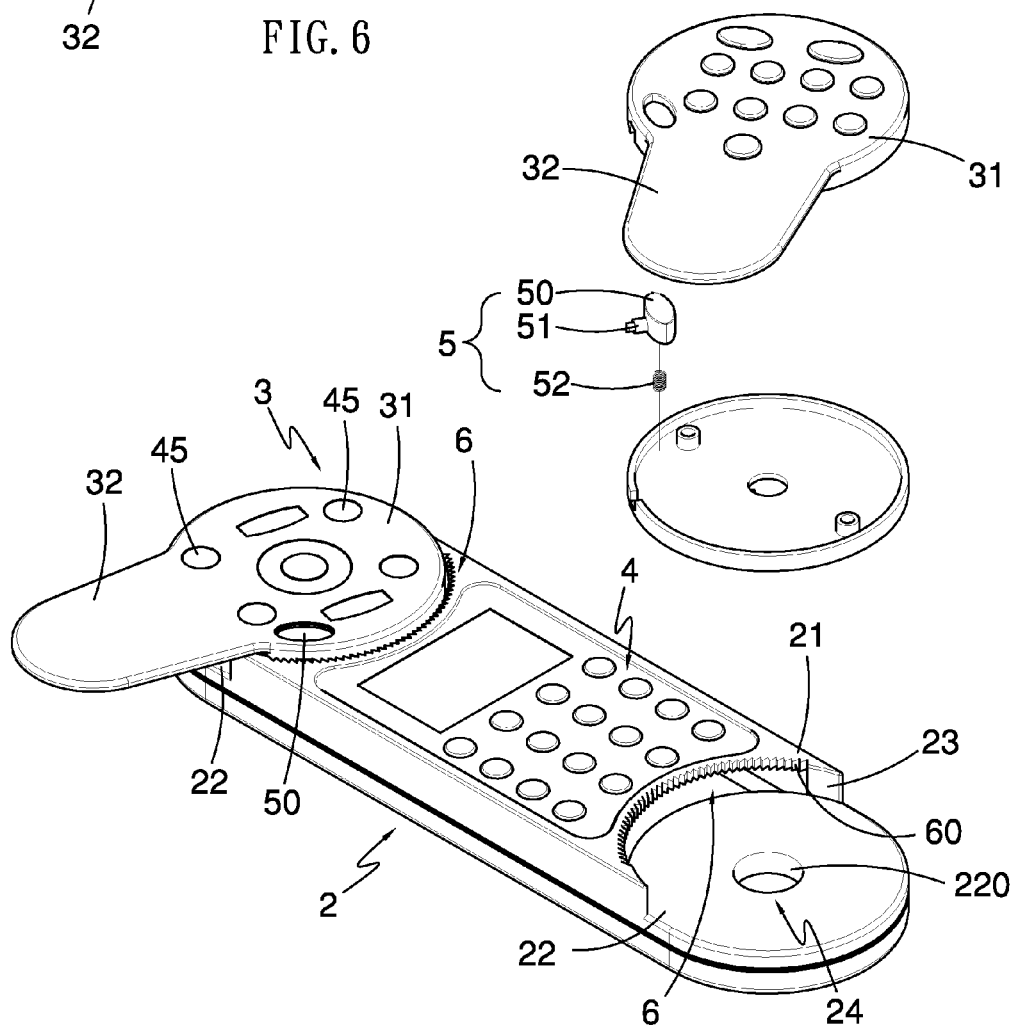
FIG. 5 is a partially exploded view of the embodiment according to the present invention.

Please refer to FIG. 5, which illustrates a detail structure of the base 2 and the movable handles 3. There are two lower surfaces 22 formed on opposite sides of the top surface 21 of the base 2 and there is a wall surface 23 formed adjacent to each lower surface 22 and the top surface 21. Each wall surface 23 is a cambered surface and forms a space 24 with each lower surface 22 respectively. Moreover, each movable handle 3 includes an axle holder 31 and a handheld portion 32. A bottom surface of the axle holder 31 forms a shaft 310 as illustrated in FIG. 6 for pivotally connecting to a shaft hole 220 of one of the lower surfaces 22 of the base 2. The axle holder 31 is shaped to match the corresponding space 24 of the base 2. The handheld portion 32 is extended from the axle holder 31.

Further, the input unit 4 can include a plurality of second home-use remote control buttons 45. These second home-use remote control buttons 45 are exposed from the axle holder 31 of each movable handle 3. Therefore, these second home-use remote control buttons 45 can still be used for remote controlling their corresponding household appliances even when the game controller is in the status as illustrated in FIGS. 3 and 4.

Besides, FIG. 5 also illustrates that the game controller further includes two base positioning portion 6 and two handle positioning portions 5. Each base positioning portion 6 includes a plurality of teeth 60 separated with intervals and formed on a higher position of each wall surface 23 of the base 2. Each handle positioning portion 5 is assembled to the axle holder 31 of each movable handle 3, and each handle positioning portion 5 includes a button 50, a positioning block 51 and a compression spring 52. The button 50 is partially exposed from the axle holder 31 and the positioning block 51 is formed on the button 50 and extended from the axle holder 31 into the intervals of the teeth 60. The compression spring 52 holds the button 50.

Figure 7:
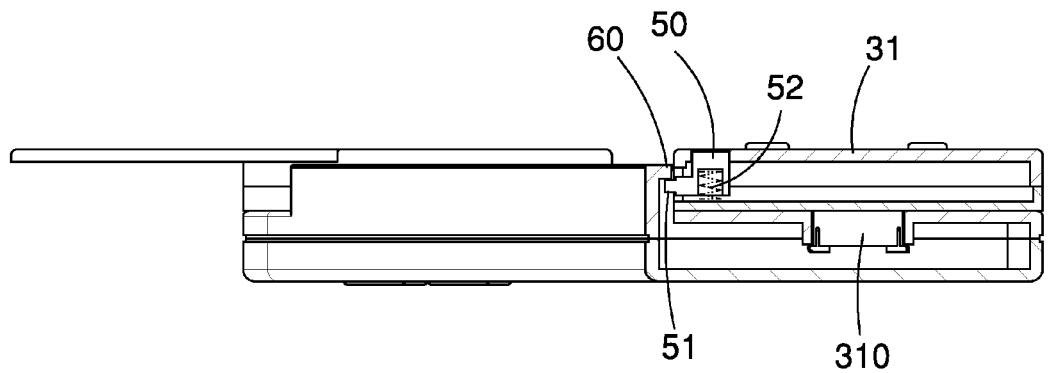
FIG. 7 illustrates rotation and positioning of the movable handles of the embodiment according the present invention.

Please refer to FIG. 7, which illustrates a status when the button 50 is pressed. In this status, the compression spring 52 is compressed so as to provide a restoring force and the positioning block 51 is accordingly moved downward away from the teeth 60 with the button 50. Therefore, in this status, the handheld portion 32 can be rotated to the using position and the receiving position through the shaft 310.

Figure 8:
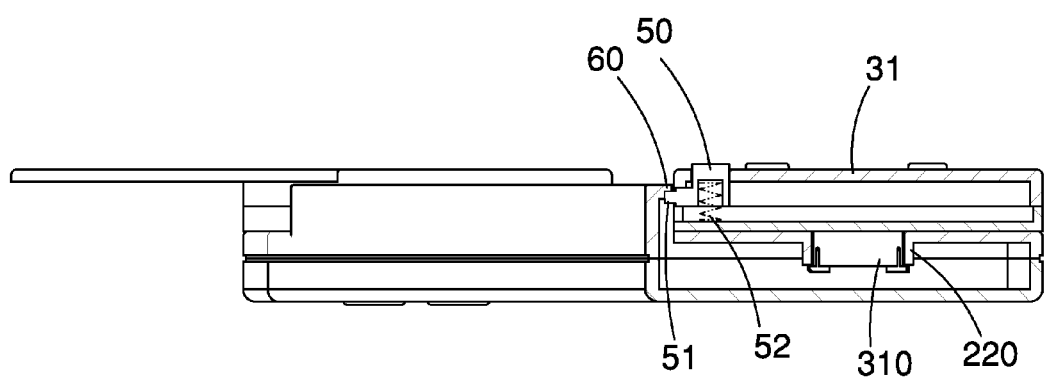
FIG. 8 illustrates rotation and positioning of the movable handles of the embodiment according the present invention.

Please refer to FIG. 8, which illustrates a status when the handheld portion 32 is positioned at a certain position. In other words, when the handheld portion 32 is rotated to a desired position, by releasing the compression on the button 50, the button 50 moves back to its original position via the restoring force of the compression spring 52, so as to move the positioning block 51 entering the intervals among the teeth 60 accordingly. This illustrates that the handheld portion 32 can be rotated and positioned at any angle in response to users' holding customs. Therefore, the present invention provides functions and advantage of free handle adjustments and space saving design, as well as purposes of multifunctional control.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extent indicated by the broad general meaning of the terms in which the appended claims are expressed.

We claim:

1. A game controller comprising:
   a housing comprising a base having a top surface and a bottom surface, and two movable handles, each movable handle comprising: a substantially circular axle holder and a planar handheld portion radially extended from the axle holder; each axle holder being assembled to the top surface of the base in a movable manner, each handheld portion protrudes from the base with a distance when each movable handle is rotated to a using position and overlaps with the top surface of the base when each movable handle is rotated to a receiving position; each movable handle being moved through at least an approximate ninety degrees of rotation between the using position and the receiving position; and
   an input unit exposed from the housing, the input unit comprising a plurality of game control buttons for controlling a game and a plurality of home-use remote control buttons for controlling at least a household appliance, wherein the game control buttons are placed within a certain region of the bottom surface of the base and the certain region is the region tangible by a thumb of a hand grasping one of the handheld portions when each movable handle is rotated to a using position; and the home-use remote control buttons are arranged on the top surface of the base,
   and two base positioning portions and two handle positioning portions, each base positioning portion being formed where the base corresponds to each movable handle, and each handle positioning portion being assembled on each movable handle for being selectively buckled on the corresponding base positioning portion.

2. The game controller of claim 1, the input unit further comprising a handwriting input pad for inputting handwriting characters.

3. The game controller of claim 1, the input unit further comprising a plurality of computer buttons and a position detection module for operating a computer.

4. The game controller of claim 2, the input unit further comprising a plurality of computer buttons and a position detection module for operating a computer.

5. A game controller having a housing and an input unit exposed from the housing, wherein the housing comprises:
   a base having a top surface, two lower surfaces adjacent to two opposite sides of the top surface and a bottom surface opposite to the top surface and the lower surfaces, wherein a wall surface is formed adjacent to each lower surface and the top surface and a space is formed respectively between each wall surface and corresponding each lower surface; and
   two movable handles, each movable handle comprising:
   a substantially circular axle holder pivotally connected to one of the lower surfaces of the base; and
   a planar handheld portion radially extended from the axle holder, the handheld portion being capable of rotating via the axle holder to a using position departed from the top surface of the base and to a receiving position overlapped with the top surface of the base; each hand held portion being moved through at least an approximate ninety degrees of rotation between the using position and the receiving position; and
   wherein the input unit comprises a plurality of game control buttons on the bottom surface of the base for controlling a game and a plurality of home-use remote control buttons exposed on the top surface of the base for controlling at least a household appliance, wherein the game control buttons are placed within a certain region of the bottom surface of the base and the certain region is the region tangible by a thumb of a hand grasping one of the handheld portions when each movable handle is rotated to the using position;

and two base positioning portions and two handle positioning portions, wherein each base positioning portion is formed where the base corresponds to each movable handle, and each handle positioning portion is assembled on each movable handle for being selectively buckled on the corresponding base positioning portion.

6. The game controller of claim 5, wherein each wall surface is a cambered surface and the axle holder of each movable handle is shaped to match the corresponding space of the base.

7. The game controller of claim 5, wherein:
each wall surface is a cambered surface;
the axle holder of each movable handle is shaped to match the corresponding space of the base;
each base positioning portion comprises a plurality of teeth, and the teeth are separated with intervals and formed on each wall surface of the base in a higher position compared to the lower surface; and each handle positioning portion is assembled to the axle holder of each movable handle, and each handle positioning portion comprising:
a button partially exposed from the axle holder;
a positioning block formed on the button and extended from the axle holder to the intervals among the teeth; and
a compression spring mounted on the axle holder for either holding up or being compressed by the button.

8. The game controller of claim 5, the input unit further comprising a handwriting input pad exposed from the top surface of the base for inputting handwriting characters.

9. The game controller of claim 5, the input unit further comprising a plurality of computer buttons and a position detection module for operating a computer, wherein the computer buttons are exposed from the top surface of the base and the position detection module is assembled in the base and is partially exposed from the bottom surface.

10. The game controller of claim 5, wherein the input unit further comprises a plurality of second home-use remote control buttons exposed from the axle holder of each movable handle.

* * * * *